A. W. Gray,
Horse Power.
No. 1,322. Reissued July 1, 1862.
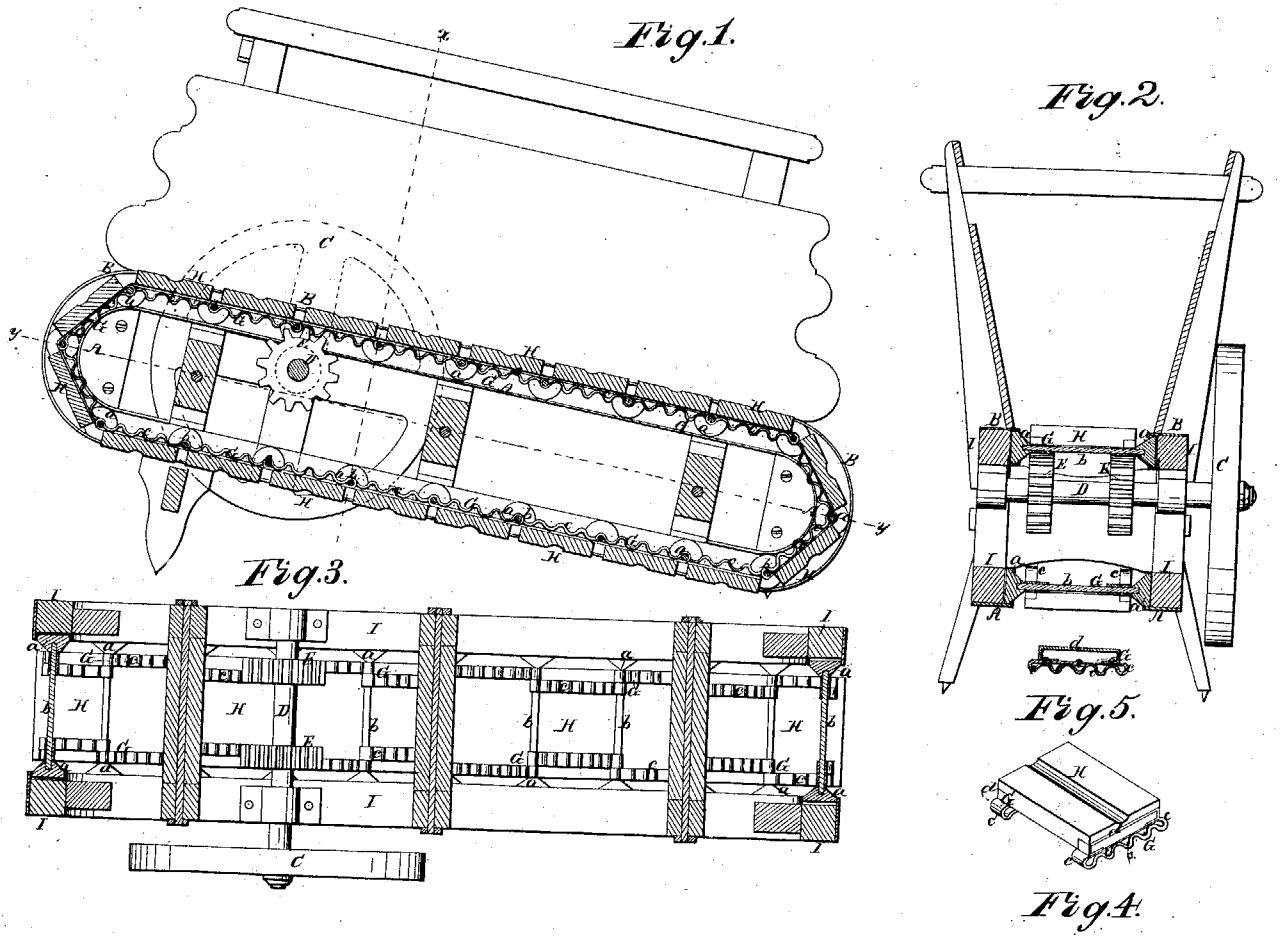
N. PETERS, PHOTO-LITHOGRAPHER, WASHINGTON, D. C.

UNITED STATES PATENT OFFICE.

ALBERT W. GRAY, OF MIDDLETOWN, VERMONT.

IMPROVEMENT IN HORSE-POWERS.

Specification forming Letters Patent No. 15,693, dated September 9, 1856; Reissue No. 1,322, dated July 1, 1862.

*To all whom it may concern:*

Be it known that I, ALBERT W. GRAY, of Middletown, in the county of Rutland and State of Vermont, have invented a new and Improved Endless Chain Horse-Power; and I do hereby declare that the following is a full and exact description thereof, reference being had to the accompanying drawings, making part of this specification.

Figure 1 is a longitudinal vertical section of the horse-power; Fig. 2, a transverse section thereof, in the plane indicated by the line *x x*, Fig. 1; Fig. 3, a longitudinal section, looking upward, in the plane indicated by the line *y y*, Fig. 1; Fig. 4, a view in perspective of one of the lags with its links attached to it; Fig. 5, a longitudinal vertical section of one of the links.

Like letters designate corresponding parts in all of the figures.

My improvements relate to the mode of constructing, arranging, and combining the lags, links, and supporting friction-rollers of the endless platform or track, whereby greater cheapness, greater strength, less weight, and less friction are secured.

The links G G, which unite the lags H H, are made of strong sheet-iron or sheet-steel, substantially in the following manner: A piece, *d*, Fig. 5, is bent into an oblong rectangular form, so as to furnish a mortise for the reception of a tenon on the end of the lag. Another strip of sheet metal is bent in such a manner that the upper side shall be straight and fit the lower side of the mortise-piece *d*, to which it is riveted, while the lower side is formed into transverse corrugations *c c*, of such form and dimensions as to constitute successive uniform cogs from end to end, the two end corrugations inclosing a round aperture, and projecting, in a longitudinal direction, sufficiently beyond the lag or mortise portion *d* to receive connecting-rods *b b*, on which the links turn, and by which they are connected together, all substantially as represented in the drawings. The whole link is readily made by suitable dies or swages, and is exceedingly light, strong, and cheap. The corrugations *c c* of the whole series of links constitute double racks on the inner side of the endless platform of lags, which racks gear into cog-wheels E E on the driving-shaft D. These cog-wheels should be about twice as thick as the links are wide, since the links of successive lags are placed side by side—that is, those of one lag are placed inside of those of the adjoining lags, and vice versa, in succession, as shown in Fig. 3. The mortises *d d* of the links are made long enough to receive the full width of the lags, but the width of the mortises is generally only sufficient to receive a portion of the thickness of the lags. The tenons on the lags are then formed by simply sawing into the ends of the lags so as to leave the proper thickness on one side to insert and just fit into the mortises, the saw-kerf being sufficiently wide to receive the thickness of the metal of the link. The driving-shaft D is placed under a straight or plane portion of the endless platform, as represented, instead of in the center of the circular portion at the upper end, as heretofore. By this improved arrangement wider lags may be employed and the corrugated links pass more freely, and with less friction, over the cog-wheels E E.

Friction-rollers *a a* are placed upon the ends of the connecting-rods *b b*. These rollers, instead of being entirely perforated for the rods *b b* to pass through them, are simply provided with holes bored or formed partly through them, substantially as represented in Figs. 2 and 3. They are then slipped loosely upon the ends of the rods without fastening, and are kept there in place by the lower and upper plates, A B, of the track on which the endless platform runs and by the side timbers, I I, of the frame of the machine. Thus the rollers are more quickly and cheaply made than the ordinary friction-rollers, and, running more freely, they obviate all binding and cramping, which generally cause endless-platform horse-powers to turn with considerable additional friction and consequent expenditure of power. This also saves the shoulders on the shafts or rods *b b*, which may thus be lighter. The inner ends of the friction-rollers are generally made conical to reduce friction against the links and to diminish their weight. There is also a saving of oil by this plan.

The advantages of a horse-power of this construction are, first, its lightness, the thin but strong sheet-iron links very much diminishing the weight of the endless platform, thus not only diminishing the whole weight of the machine, but increasing the effective power thereof; second, readiness and cheapness of construction; third, lessened friction; fourth, equal or superior strength.

What I claim as my invention, and desire to secure by Letters Patent, is—

1. Constructing the links which compose the endless chains of corrugated and bent sheet metal, so that the corrugations shall serve both as hinges for connecting the links and as cogs to gear into the cog-wheels of the driving-shaft, substantially as herein specified.

2. The friction-rollers *a a*, only partially perforated for the reception of their bearings *b b*, which have no shoulders, arranged and operating substantially as and for the purposes herein set forth.

3. The method of forming the tenons on the ends of the lags to enter the mortises of the sheet-metal links by means of the simple saw-kerfs, substantially as specified.

ALBERT W. GRAY.

Witnesses:
L. C. COPELAND,
M. E. VAIL.